(12) United States Patent
Howard et al.

(10) Patent No.: US 9,356,461 B2
(45) Date of Patent: May 31, 2016

(54) METHODS AND SYSTEMS FOR RAPID WIRELESS CHARGING WHERE THE LOW STATE OF CHARGE (SOC) TEMPERATURE DEPENDENT CHARGING CURRENT AND LOW SOC TEMPERATURE LIMIT ARE HIGHER THAN THE HIGH SOC TEMPERATURE DEPENDENT CHARGING CURRENT AND HIGH SOC TEMPERATURE LIMIT

(71) Applicant: Google Technology Holdings LLC, Mountain View, CA (US)

(72) Inventors: Jason N. Howard, Alpharetta, GA (US); Michael G. Hanley, Lawrenceville, GA (US)

(73) Assignee: Google Technology Holdings, LLC, Mountain View, CA (US)

( * ) Notice: Subject to any disclaimer, the term of this patent is extended or adjusted under 35 U.S.C. 154(b) by 481 days.

(21) Appl. No.: 13/625,976

(22) Filed: Sep. 25, 2012

(65) Prior Publication Data
US 2014/0084856 A1     Mar. 27, 2014

(51) Int. Cl.
*H02J 7/00* (2006.01)
*H02J 7/02* (2006.01)
(Continued)

(52) U.S. Cl.
CPC ............. *H02J 7/007* (2013.01); *H01M 10/443* (2013.01); *H02J 5/005* (2013.01); *H02J 7/0091* (2013.01);
(Continued)

(58) Field of Classification Search
CPC ............ H04B 1/38; H04B 5/00; H02J 17/00; H02J 7/14; H02J 7/02; H02J 7/025; B60L 11/182; Y02T 90/122; H01F 38/14

USPC ................. 320/134, 138, 162, 108, 150, 153
See application file for complete search history.

(56) References Cited

U.S. PATENT DOCUMENTS 2,499,663 A * 3/1950 Medlar .......................... 320/150
2,529,038 A * 11/1950 Medlar et al. ................. 320/150
(Continued)

FOREIGN PATENT DOCUMENTS

DE     10118189    11/2002
EP      1298809     4/2003
(Continued)

OTHER PUBLICATIONS

Patent Cooperation Treaty, International Search Report and Written Opinion of the International Searching Authority for International Application No. PCT/US2013/054623, May 14, 2014, 14 pages.
(Continued)

*Primary Examiner* — Robert Grant
*Assistant Examiner* — John Trischler
(74) *Attorney, Agent, or Firm* — Wolfe-SBMC

(57) ABSTRACT

A system and method for wireless charging are provided. A control circuit charges one or more cells in a secondary wireless charging circuit that receives power wirelessly from a primary. The control circuit determines the state of charge and temperature of the cells. The control circuit then calculates a current limit as a function of a combination of the state of charge, input voltage to the control circuit for the wireless controller, FET power dissipation and the temperature and adjusts a wireless power control device in the secondary such that its current limit is set to the state of charge current limit. Different temperature limits can be used for different states of charge such that the cells can be charged at higher temperatures at low states of charge than at higher states of charge.

18 Claims, 10 Drawing Sheets

(51) Int. Cl.
  *H02J 7/04* (2006.01)
  *H01M 10/42* (2006.01)
  *H01M 10/44* (2006.01)
  *H01F 7/20* (2006.01)
  *H01M 10/61* (2014.01)
  *H02J 17/00* (2006.01)
  *H02J 5/00* (2016.01)
  *H01F 7/02* (2006.01)

(52) U.S. Cl.
  CPC .............. *H02J 7/025* (2013.01); *H02J 7/042* (2013.01); *H02J 7/044* (2013.01); *H02J 7/045* (2013.01); *H02J 7/047* (2013.01); *H02J 17/00* (2013.01); *H01F 7/0247* (2013.01); *H02J 7/0073* (2013.01)

(56) References Cited

U.S. PATENT DOCUMENTS

| | | | |
|---|---|---|---|
| 2,563,234 A * | 8/1951 | Godshalk et al. ............. 320/150 |
| 2,627,060 A * | 1/1953 | Berg ............................. 320/160 |
| 2,637,836 A * | 5/1953 | Kendall ................ H02J 7/047 320/150 |
| 3,678,363 A * | 7/1972 | Ringle .................. H02J 7/008 320/160 |
| 4,061,956 A * | 12/1977 | Brown ................ H02J 7/0091 320/146 |
| 4,082,097 A | 4/1978 | Mann et al. ........................ 607/33 |
| 4,629,965 A * | 12/1986 | Fallon et al. ...................... 320/156 |
| 4,649,333 A * | 3/1987 | Moore .............................. 320/152 |
| 4,692,682 A * | 9/1987 | Lane et al. ........................ 320/152 |
| 4,712,055 A * | 12/1987 | Houser, Jr. ............. H02J 7/0091 320/144 |
| 4,727,306 A * | 2/1988 | Misak et al. ..................... 320/152 |
| 4,745,349 A * | 5/1988 | Palanisamy ........... H02J 7/0006 320/125 |
| 5,012,176 A * | 4/1991 | LaForge ........................ 320/152 |
| 5,136,231 A * | 8/1992 | Faulk .................. H02J 7/008 320/134 |
| 5,166,596 A * | 11/1992 | Goedken ......................... 320/150 |
| 5,172,044 A * | 12/1992 | Sasaki et al. .................... 320/160 |
| 5,179,335 A * | 1/1993 | Nor .................................. 320/159 |
| 5,185,566 A | 2/1993 | Goedken |
| 5,363,031 A * | 11/1994 | Miller ................ G01R 31/3655 320/115 |
| 5,481,175 A * | 1/1996 | Qualich et al. ................. 320/103 |
| 5,504,416 A * | 4/1996 | Holloway ............ H01M 10/44 320/152 |
| 5,523,667 A * | 6/1996 | Feldstein ....................... 320/118 |
| 5,640,059 A * | 6/1997 | Kammiller ............. B60L 3/0046 236/46 R |
| 5,656,920 A * | 8/1997 | Cherng et al. ................... 320/161 |
| 5,731,694 A * | 3/1998 | Wilcox et al. ................... 323/287 |
| 5,736,834 A * | 4/1998 | Kuno .............................. 320/146 |
| 5,804,944 A | 9/1998 | Alberkrack et al. |
| 5,815,389 A * | 9/1998 | Plow ........................ G06F 1/26 320/134 |
| 5,900,718 A * | 5/1999 | Tsenter ................ H02J 7/0077 320/151 |
| 6,094,033 A | 7/2000 | Ding et al. |
| 6,144,186 A | 11/2000 | Thandiwe et al. |
| 6,275,006 B1 * | 8/2001 | Koike ................ H02J 7/0073 320/125 |
| 6,298,233 B1 | 10/2001 | Souissi |
| 6,330,455 B1 | 12/2001 | Ichihara |
| 6,470,003 B1 | 10/2002 | Smith et al. |
| 6,495,992 B1 * | 12/2002 | Pavlovic ........................ 320/161 |
| 6,639,462 B1 | 10/2003 | Luu |
| 6,771,051 B2 * | 8/2004 | Oglesbee et al. ............... 320/150 |
| 6,803,746 B2 * | 10/2004 | Aker et al. ...................... 320/139 |
| 6,850,040 B2 * | 2/2005 | Xiong et al. ................... 320/134 |
| 6,917,182 B2 * | 7/2005 | Burton et al. ................... 320/108 |
| 6,927,555 B2 | 8/2005 | Johnson |
| 7,146,139 B2 | 12/2006 | Nevermann |
| 7,151,411 B2 | 12/2006 | Martin et al. |
| 7,158,804 B2 | 1/2007 | Kumaran et al. |
| 7,170,341 B2 | 1/2007 | Conrad et al. |
| 7,549,177 B2 | 6/2009 | Diefenbaugh et al. |
| 7,724,194 B2 | 5/2010 | Black et al. |
| 8,013,674 B2 | 9/2011 | Drogi et al. |
| 8,054,039 B2 | 11/2011 | Bauerle et al. |
| 8,155,081 B1 | 4/2012 | Mater et al. |
| 8,204,446 B2 | 6/2012 | Scheer et al. |
| 8,232,685 B2 | 7/2012 | Perper et al. |
| 8,269,467 B2 * | 9/2012 | Li et al. .......................... 320/153 |
| 8,278,871 B2 * | 10/2012 | Kallmyer ............. A61N 1/3787 320/108 |
| 8,288,994 B2 | 10/2012 | Jakes et al. |
| 8,427,011 B2 * | 4/2013 | Jung et al. ...................... 307/104 |
| 8,436,492 B2 * | 5/2013 | Jung et al. ...................... 307/104 |
| 8,538,428 B2 | 9/2013 | Bartlett |
| 8,552,593 B2 * | 10/2013 | Jung et al. ...................... 307/104 |
| 8,552,693 B2 * | 10/2013 | Paryani ................. H02J 7/047 320/104 |
| 8,592,065 B2 | 11/2013 | Bhardwaj et al. |
| 8,624,546 B2 * | 1/2014 | Jung et al. ...................... 320/108 |
| 8,643,342 B2 * | 2/2014 | Mehta .................. H02J 7/0073 320/160 |
| 8,754,614 B2 * | 6/2014 | Paryani ............. H01M 10/0525 320/160 |
| 8,760,010 B2 * | 6/2014 | Jung et al. ...................... 307/104 |
| 8,805,764 B1 | 8/2014 | Rhines et al. |
| 9,246,454 B2 | 1/2016 | Schirmann et al. |
| 2001/0017602 A1 | 8/2001 | Hieb |
| 2003/0085684 A1 * | 5/2003 | Tsukamoto et al. .......... 320/108 |
| 2003/0189417 A1 * | 10/2003 | Dias et al. ...................... 320/134 |
| 2003/0228875 A1 | 12/2003 | Alapuranen |
| 2003/0228891 A1 | 12/2003 | Kobayashi et al. |
| 2004/0075494 A1 | 4/2004 | Klomsdorf et al. |
| 2004/0117330 A1 | 6/2004 | Ehlers et al. |
| 2004/0176125 A1 | 9/2004 | Lee |
| 2004/0222769 A1 * | 11/2004 | Al-Anbuky et al. .......... 320/128 |
| 2004/0257040 A1 * | 12/2004 | Xiong et al. ................... 320/128 |
| 2005/0017677 A1 * | 1/2005 | Burton ................ H02J 7/025 320/108 |
| 2005/0030094 A1 | 2/2005 | Conrad et al. |
| 2005/0046387 A1 * | 3/2005 | Aker et al. ...................... 320/125 |
| 2005/0168193 A1 * | 8/2005 | Xiong et al. ................... 320/134 |
| 2005/0253561 A1 * | 11/2005 | Tibbs ............................ 320/150 |
| 2006/0028176 A1 * | 2/2006 | Tang .................. H02J 7/0004 320/114 |
| 2006/0158156 A1 * | 7/2006 | Gamboa ........................ 320/141 |
| 2007/0069735 A1 | 3/2007 | Graf et al. |
| 2007/0188139 A1 * | 8/2007 | Hussain et al. ................ 320/128 |
| 2008/0074084 A1 * | 3/2008 | Lee ........................ H02J 7/0031 320/150 |
| 2008/0154624 A1 | 6/2008 | O'Neil |
| 2008/0197711 A1 * | 8/2008 | Kato et al. ...................... 307/104 |
| 2008/0211455 A1 * | 9/2008 | Park .................... H02J 7/025 320/108 |
| 2008/0303480 A1 * | 12/2008 | Prutchi et al. ................. 320/108 |
| 2009/0102294 A1 | 4/2009 | Hodges et al. |
| 2009/0131074 A1 | 5/2009 | Minier |
| 2009/0206797 A1 * | 8/2009 | Chueh et al. ................... 320/150 |
| 2009/0295226 A1 | 12/2009 | Hodges et al. |
| 2010/0033138 A1 * | 2/2010 | Alger et al. ..................... 320/153 |
| 2010/0085010 A1 | 4/2010 | Suzuki et al. |
| 2010/0127666 A1 * | 5/2010 | Ball ................................. 320/152 |
| 2010/0127889 A1 | 5/2010 | Vogel et al. |
| 2010/0156355 A1 * | 6/2010 | Bauerle et al. ................. 320/145 |
| 2010/0198423 A1 | 8/2010 | Hirst |
| 2010/0198713 A1 | 8/2010 | Forbes et al. |
| 2010/0233989 A1 | 9/2010 | Constien et al. |
| 2010/0266066 A1 | 10/2010 | Takahashi |
| 2010/0283691 A1 | 11/2010 | Su et al. |
| 2011/0012562 A1 * | 1/2011 | Paryani .................. H02J 7/047 320/152 |
| 2011/0018346 A1 | 1/2011 | Dixon |
| 2011/0037439 A1 * | 2/2011 | Bhardwaj et al. ............. 320/152 |
| 2011/0070848 A1 | 3/2011 | Ramachandra |
| 2011/0071597 A1 * | 3/2011 | Aghassian ......... A61N 1/37235 607/61 |
| 2011/0090126 A1 | 4/2011 | Szini et al. |

(56) References Cited

U.S. PATENT DOCUMENTS

| | | | |
|---|---|---|---|
| 2011/0119005 A1 | 5/2011 | Majima et al. | |
| 2011/0121836 A1 | 5/2011 | Kim et al. | |
| 2011/0140538 A1* | 6/2011 | Jung | H02J 7/0027 307/104 |
| 2011/0151942 A1* | 6/2011 | Hanley et al. | 455/573 |
| 2011/0156661 A1* | 6/2011 | Mehta | H02J 7/0073 320/160 |
| 2011/0222469 A1 | 9/2011 | Ali et al. | |
| 2011/0275369 A1 | 11/2011 | Bartlett et al. | |
| 2011/0291619 A1 | 12/2011 | Asakura | |
| 2011/0316475 A1* | 12/2011 | Jung | H04B 5/0037 320/108 |
| 2012/0021800 A1 | 1/2012 | Wilson et al. | |
| 2012/0032646 A1 | 2/2012 | Lee | |
| 2012/0071195 A1 | 3/2012 | Chakraborty et al. | |
| 2012/0146576 A1* | 6/2012 | Partovi | H01F 7/0252 320/108 |
| 2012/0147801 A1 | 6/2012 | Ho et al. | |
| 2012/0210325 A1 | 8/2012 | De Lind Van Wijngaarden et al. | |
| 2012/0213172 A1 | 8/2012 | Kim et al. | |
| 2012/0235636 A1* | 9/2012 | Partovi | 320/108 |
| 2012/0242906 A1 | 9/2012 | Shintani et al. | |
| 2013/0020862 A1* | 1/2013 | Miller | H02J 5/005 307/9.1 |
| 2013/0121194 A1 | 5/2013 | Heshmati | |
| 2013/0122827 A1 | 5/2013 | Ali et al. | |
| 2013/0169348 A1 | 7/2013 | Shi | |
| 2013/0237254 A1 | 9/2013 | Papakipos et al. | |
| 2013/0249479 A1* | 9/2013 | Partovi | 320/108 |
| 2013/0257359 A1* | 10/2013 | Sakai et al. | 320/107 |
| 2014/0068288 A1 | 3/2014 | Robinson et al. | |
| 2014/0070761 A1* | 3/2014 | Labbe | A61N 1/378 320/108 |
| 2014/0070762 A1* | 3/2014 | Jenwatanavet et al. | 320/108 |
| 2014/0084856 A1* | 3/2014 | Howard et al. | 320/108 |
| 2014/0092243 A1* | 4/2014 | Ichikawa | 348/143 |
| 2014/0097671 A1* | 4/2014 | Nakamura et al. | 307/9.1 |
| 2014/0176067 A1* | 6/2014 | Suzuki et al. | 320/108 |
| 2014/0232330 A1* | 8/2014 | Robertson et al. | 320/108 |
| 2014/0253023 A1* | 9/2014 | Paryani et al. | 320/107 |
| 2014/0266462 A1 | 9/2014 | Schirmann et al. | |
| 2014/0274188 A1 | 9/2014 | Thorson et al. | |
| 2015/0234054 A1 | 8/2015 | Lennen et al. | |
| 2015/0349372 A1 | 12/2015 | Maleki et al. | |
| 2015/0379533 A1 | 12/2015 | Alberth et al. | |
| 2016/0043752 A1 | 2/2016 | Slater et al. | |
| 2016/0072326 A1 | 3/2016 | Nilles | |

FOREIGN PATENT DOCUMENTS

| | | |
|---|---|---|
| EP | 1505725 | 7/2009 |
| EP | 2077682 | 7/2009 |
| EP | 2222371 B1 | 5/2011 |
| EP | 2595269 | 5/2013 |
| JP | H09247852 | 9/1997 |
| JP | 2003333200 | 11/2003 |
| WO | WO-9306682 | 4/1993 |
| WO | 2011084367 A2 | 7/2011 |
| WO | 2011090769 A1 | 7/2011 |
| WO | WO-2013152149 | 10/2013 |

OTHER PUBLICATIONS

International Bureau of WIPO, International Preliminary Report on Patentability in International Patent Application PCT/US2013/054623 (Apr. 9, 2015).

"3GTPP TS 36.213 V9.3.0 3rd Generation Partnership Project Technical Speficiation Group Radio Access Network", Evolved Universal Terrestrial Radio Access (E-UTRA); Physical layer procedures (Release 9), Sep. 2010, 80 pages.

"Ex Parte Quayle Action", U.S. Appl. No. 14/108,544, Apr. 23, 2015, 8 pages.

"Ex Parte Quayle Action", U.S. Appl. No. 14/451,950, Aug. 4, 2015, 7 pages.

"Final Office Action", U.S. Appl. No. 13/477,609, Jul. 31, 2015, 11 pages.

"Final Office Action", U.S. Appl. No. 13/798,682, Jul. 30, 2015, 12 pages.

"First Choice Power", http://www.firstchoicepower.com/plans-services/electricity-plans/variable-rate-electricity-plans.aspx—Retrieved on May 18, 2012, 1 page.

"How Does Prepaid Electricity Work", http://www.mxenergy.com/does-prepaid-electricity-work-a-19.html—Retrieved on Jan. 15, 2012, 3 pages.

"International Preliminary Report on Patentability", Application No. PCT/US2013/060170, Mar. 24, 2015, 6 pages.

"International Preliminary Report on Patentability", Application No. PCT/US2013/042042, Mar. 10, 2015, 8 pages.

"International Preliminary Report on Patentability", Application No. PCT/US2014/014994, Sep. 15, 2015, 8 pages.

"International Search Report and Written Opinion", Application No. PCT/US2014/070384, Mar. 13, 2015, 12 pages.

"International Search Report and Written Opinion", Application No. PCT/US2014/014994, Mar. 21, 2014, 12 pages.

"International Search Report and Written Opinion", Application No. PCT/US2013/040242, Oct. 4, 2013, 14 pages.

"International Search Report and Written Opinion", Application No. PCT/US2014/018479, Jul. 22, 2014, 17 pages.

"International Search Report and Written Opinion", Application No. PCT/US2013/060170, Dec. 5, 2013, 8 pages.

"Non-Final Office Action", U.S. Appl. No. 13/477,609, Dec. 3, 2014, 7 pages.

"Non-Final Office Action", U.S. Appl. No. 13/477,609, Dec. 14, 2015, 9 pages.

"Non-Final Office Action", U.S. Appl. No. 13/621,857, Nov. 14, 2014, 5 pages.

"Non-Final Office Action", U.S. Appl. No. 13/798,682, Feb. 17, 2015, 10 pages.

"Non-Final Office Action", U.S. Appl. No. 13/798,682, Dec. 4, 2015, 13 pages.

"Non-Final Office Action", U.S. Appl. No. 14/457,190, Sep. 18, 2015, 25 pages.

"Notice of Allowance", U.S. Appl. No. 13/621,857, Jan. 26, 2015, 7 pages.

"Notice of Allowance", U.S. Appl. No. 13/621,857, May 11, 2015, 5 pages.

"Notice of Allowance", U.S. Appl. No. 14/108,544, Oct. 15, 2015, 6 pages.

"Restriction Requirement", U.S. Appl. No. 13/621,857, Aug. 18, 2014, 7 pages.

"Your Choice Your Plan", GreyStone Power Corporation, http://www.greystonepower.com/UploadedFiles/pdf/prepaid%20brochure.pdf—Retrieved on Jun. 4, 2012, 2 pages.

Park, "Energy Maps for Large-scale, Mobile Wireless Networks", IEEE International Conference on Communications, 2007, Jun. 24, 2007, 6 pages.

"Supplemental Notice of Allowance", U.S. Appl. No. 14/451,950, Jan. 29, 2016, 2 pages.

"Final Office Action", U.S. Appl. No. 14/457,190, Mar. 3, 2016, 33 pages.

"Notice of Allowance", U.S. Appl. No. 14/451,950, Jan. 15, 2016, 5 pages.

"Notice of Allowance", U.S. Appl. No. 13/477,609, Apr. 11, 2016, 5 pages.

\* cited by examiner

*Example data included in Error Signals 313:
power adjustment data, authentication data, control data, power usage data, etc.

METHODS AND SYSTEMS FOR RAPID WIRELESS CHARGING WHERE THE LOW STATE OF CHARGE (SOC) TEMPERATURE DEPENDENT CHARGING CURRENT AND LOW SOC TEMPERATURE LIMIT ARE HIGHER THAN THE HIGH SOC TEMPERATURE DEPENDENT CHARGING CURRENT AND HIGH SOC TEMPERATURE LIMIT

TECHNICAL FIELD

This invention relates generally to charging cells of batteries, and more particularly to wirelessly charging cells of batteries.

BACKGROUND

Portable electronic devices, such as cellular telephones, laptop computers, tablet computers, pagers, and two-way radios for example, derive their portability from batteries having rechargeable cells. These batteries allow these devices to slip the surly bonds of power supplies tethered to walls and to travel wirelessly with users wherever they may go. A typical battery disposed within one of these devices may be charged and discharged hundreds of times over its lifetime. This is particularly true due to the daily reliance people increasingly place upon their personal devices.

It is known that the rechargeable batteries of many devices can be recharged wirelessly, e.g., induction-charging systems are commonly found in devices like portable motorized toothbrushes. Similarly, portable wireless communication devices and other battery-powered devices can utilize a rechargeable battery that can be recharged wirelessly. Such devices are popular due to the convenience afforded to a user by working without a wired connection. With wireless charging, the user need not connect plugs to sockets to charge a battery. Additionally, the user is able to more quickly remove the device from the charger after the battery has been charged.

While wireless charging offers an increased convenience, design issues can limit the rate at which the cells of a battery can effectively be charged. For example, thermal limitations of the system can extend the charging time or terminate charging prematurely.

It would be advantageous to have an improved wireless charging system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
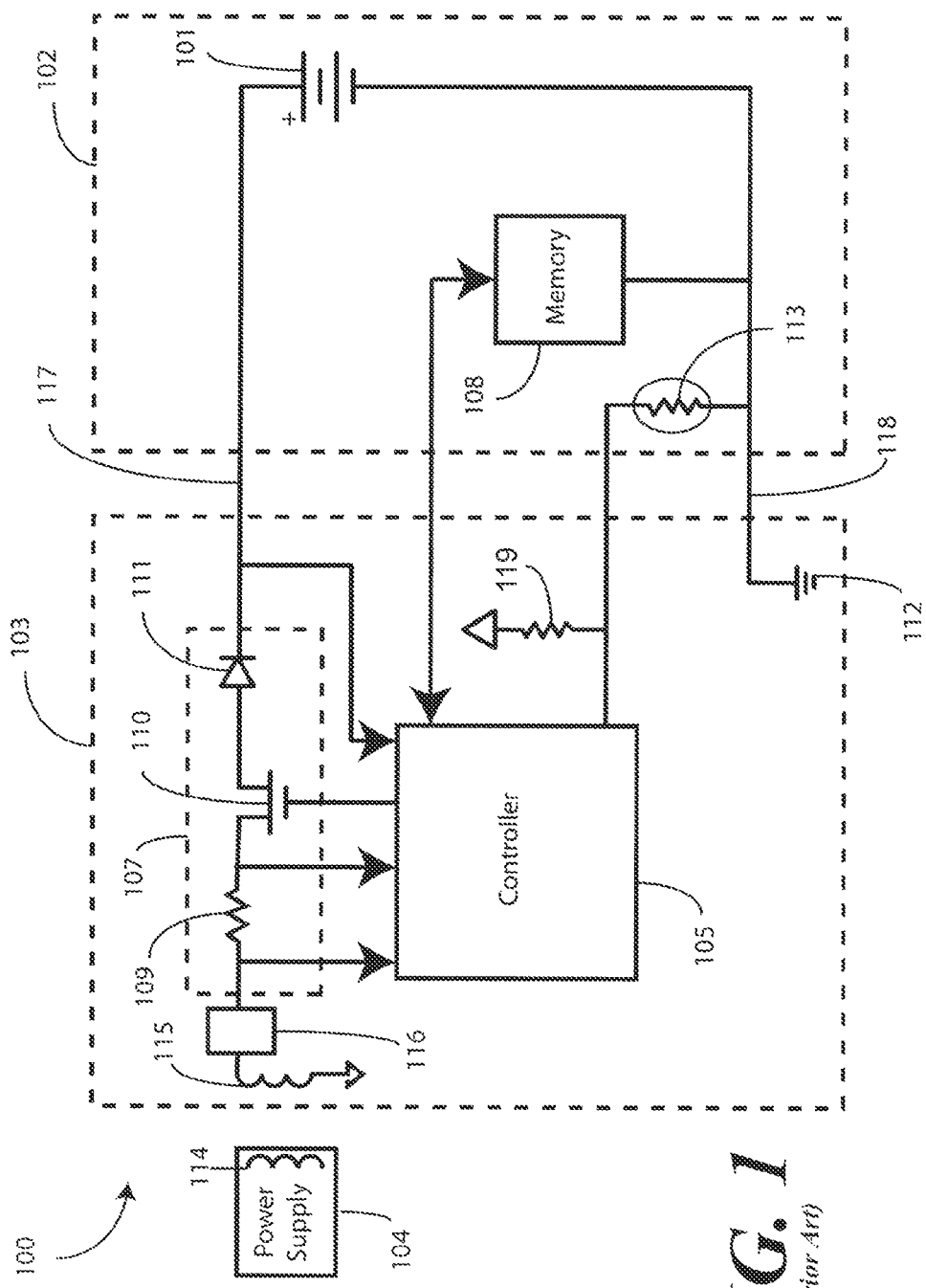
FIG. 1 illustrates a prior art wireless charging system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF EMBODIMENTS OF THE INVENTION

Before describing in detail embodiments that are in accordance with the present invention, it should be observed that the embodiments reside primarily in combinations of method steps and apparatus components related to wirelessly charging cells of a battery. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions controlling processors and control devices to wirelessly charge one or more cells as described herein. The non-processor circuits may include, but are not limited to, a radio receiver, a radio transmitter, signal drivers, clock circuits, power source circuits, and user input devices. As such, these functions may be interpreted as steps of a method to perform wireless charging, voltage regulation, current regulation, and thermal cell management. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Turning now to FIG. 1, illustrated therein is one embodiment of a prior art wireless battery charging system 100. The battery charging system 100 of FIG. 1 is configured to wirelessly charge one or more cells 101 disposed within a battery 102 by way of a charger 103 that receives inductive power from a power supply 104. The power supply 104 includes a primary coil 114 that is configured to wirelessly deliver power via induction to the charger 103. For example, the primary coil 114 can be electromagnetically coupled to a secondary coil 115 disposed in the charger 103. The charger 103 can be disposed within the battery 102 or within an electronic device coupled to the battery 102, and provides power through electrical contacts 117,118 to the cell 101.

The primary coil 114 and the secondary coil 115 each include a plurality of turns. A voltage is induced in the secondary coil 115 due to a magnetic field generated by the primary coil 114. In accordance with Faraday's law the voltage induced in the secondary coil 115 is proportional to the level of magnetic flux flowing in the secondary coil 115 and the number of turns in the secondary coil 115. The secondary coil 115 can include one or more taps to provide direct electrical connections to turns on the secondary coil 115.

The secondary coil 115 is coupled to an alternating current to direct current
(AC/DC) converter 116. The AC/DC converter 116 converts alternating currents and voltages received by the secondary coil 115 to direct currents and voltages that can be used to charge the cell 101. The charger 103 then feeds the direct current to the battery 102 so that the cell 101 can be charged.

The charger 103 includes a control circuit 105 configured to control the amount of charging current that flows to the battery 102. The control circuit 105 does this with a current control circuit 107. The current control circuit 107 includes a sense resistor 109, a field effect transistor (FET) 110 and a diode 111. The control circuit 105 can determine suitable currents for charging the cell 101 by reading data stored in a memory 108 of the battery 102. The control circuit 105 can also measure the temperature of the cell 101 by measuring a voltage between a thermistor 113 disposed within the battery 102 and a pull-up resistor 119.

In operation, when the charger 103 is receiving power from the power supply 104, charging current flows through the charger 103. The control circuit 105 monitors the amount of charging current being transferred to the battery 102 with the sense resistor 109. The voltage applied to the battery 102 is sensed from the electrical contacts 117,118.

During the charging process, in addition to monitoring charging current and charging voltage, the control circuit 105 monitors the temperature of the cell 101 disposed within the battery 102. This is due to thermal limitations for the cell 101 that are set by the manufacturer. If the temperature rises above a predetermined threshold, the control circuit 105 must reduce the amount of current to avoid compromising the reliability of the cell 101.

Figure 2:
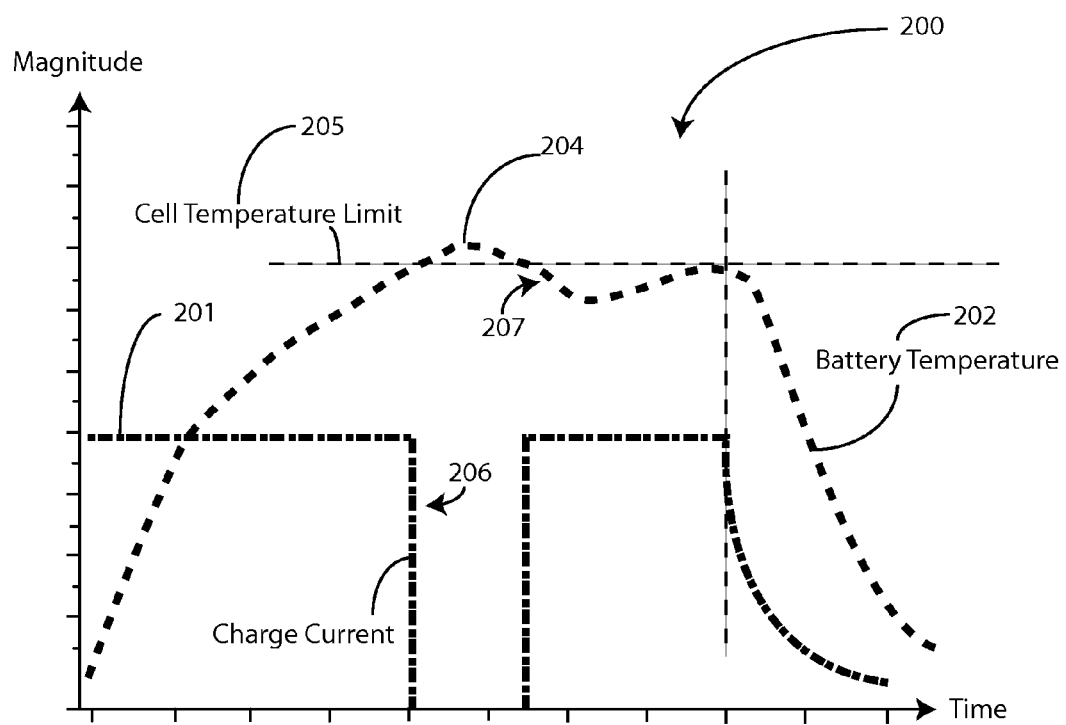
FIG. 2 illustrates thermal charging termination associated with a prior art charging system.

Turning now to FIG. 2, illustrated therein is a graph 200 illustrating how this works. The control circuit (105) initially charges the cell (101) with a direct current 201. This causes the temperature 202 of the cell (101) to rise.

During charging, the temperature 202 can peak 204 and exceed the manufacturer's maximum temperature threshold 205. The control circuit (105) must then decrease 206 the charging current 201 to reduce 207 the charging temperature 202 below the manufacturer's maximum temperature threshold 205. This reduction in charging current 201 delays the application of charging current and causes the amount of time required to charge the cell (101) to greatly increase. The longer charging time is thus problematic.

While the series impedance of the cell (101) is one source of heat resulting in the rise in temperature 202, there are actually several sources of heat in a wireless charging system. For example, heat dissipated in the primary coil (114) gets transferred across the wireless interface to the secondary coil (115) and can cause an increase in the temperature 202. Similarly, heat is generated in the secondary coil (115) due to current flowing through the secondary coil (115). This can affect the temperature 202 of the cell (101). Further, heat dissipated in the current control circuit (107) can cause the temperature 202 of the cell (101) to rise.

The fact that the primary coil (114) and secondary coil (115) are major heat generators makes thermal issues more problematic in wireless charging systems than in conventional wired charging systems. Specifically, in wireless charging systems, as charging current 201 is increased, the temperature 202 increases sharply due to the inherent inefficiencies of the primary coil (114) and the secondary coil (115). This makes management of the charging current far more difficult in wireless systems. The temperature limitations of prior art wireless charging systems greatly extend the overall charge time. These long charge times offset much of the convenience offered by wireless charging platforms.

Embodiments of the present invention work to overcome the deficiencies of prior art systems by basing the charging current limit upon the state of charge of the cells, the temperature of the cells, or combinations thereof. Embodiments of the invention further control the amount of power being delivered from the primary coil to the secondary coil by adjusting the current limit of the secondary's power management system as a function of the state of charge of the cells throughout the charging process. For instance, in one embodiment, two distinct predetermined thermal limits for a cell are used to increase charging efficiency. Higher currents are applied to charge the cell to a higher temperature when the state of charge is low, and lower currents are applied when the state of charge is high. A lower temperature threshold is therefore used when charging at higher states of charge. Illustrating by example, the maximum permitted cell temperature for low state of charge charging may be 60 degrees centigrade, while the maximum permitted cell temperature at higher states of charge may be only 45 degrees centigrade. This "multi-tiered" temperature thresholding method accommodates faster charging during times when higher temperatures can be tolerated without compromising reliability, while returning to lower temperature, slower charging when thermal management becomes more important, i.e., at higher states of charge. The use of multiple state of charge thresholds results in faster overall charging than, for instance, the system of FIGS. 1 and 2.

In one embodiment, to employ the multi-tiered thermal management approach of methods described herein, a control circuit operable with one or more cells in a rechargeable battery that is configured to determine the state of charge of the cell(s), a voltage applied to the cell(s), a current flowing through the cell(s), and a temperature of the cell(s), implements the multi-tiered thermal management approach by adjusting the current limit of a wireless power control device. The use of this control device allows commonly available, off-the-shelf, wireless power control devices to be used in accordance with embodiments of the invention without customization. The control device, in one embodiment, is effectively able to artificially adjust the current limit of the wireless power control device to make the wireless control device think that the cell(s) are in a different state of charge than they actually are. This provides the ability to charge at higher currents at lower states of charge, and vice versa, without the need of a complex, expensive wireless power control device.

In one embodiment, a method of adjusting the wireless power control device of a secondary in a wireless charging circuit for one or more cells, that is in communication with a primary of the wireless charging circuit, includes the control circuit first determining a state of charge of the cell(s). As will be shown below, state of charge can be determined in a variety of ways. However, in a simple embodiment, experimental testing has shown that measuring the cell voltage, charging current, cell temperature, or combinations thereof, provide a sufficiently accurate approximation of the state of charge to substantially decrease the overall charging time.

Once the control circuit determines the state of charge, it compares the state of charge to a predetermined threshold. Using voltage as a determinant of state of charge for explanation, for a single, lithium-based cell having an operating voltage range of about 2.7 volts to 4.2 volts, the control circuit may determine whether the voltage was less than or equal to 3.8 volts, or alternatively above this threshold. In other cells, the operating voltage has a range of about 2.5 volts to about 4.35 volts. In these cells, the control circuit may determine whether the voltage was less than or equal to about 4.0 volts, or alternatively above this threshold. Regardless of cell type or absolute limit, where the state of charge is equal to or below the selected threshold, the control circuit may determine that the cell is in the "low state of charge" condition. Where above this threshold, the control circuit may determine that the cell is in the "high state of charge threshold."

When the state of charge is low, the control circuit may adjust the wireless power control circuit such that its current limit is increased. This can include calculating a low state of charge current limit that, in some embodiments, is higher than a high state of charge current limit would be. The control circuit can then deliver a current limit adjustment input to the wireless power control device to set the current limit to the low state of charge current limit. This allows the cell to charge at a relatively high temperature. The control circuit monitors the low state of charge temperature threshold and, should the temperature reach this threshold, readjusts the wireless power control circuit to a lower current limit.

The control circuit then continues to monitor state of charge. Once the control circuit determines that the state of charge is above the predetermined state of charge threshold, which is 3.8 volts in this illustrative example, the control circuit calculates a high state of charge current limit based upon the state of charge. In one or more embodiments, the state of charge is a function of the temperature of the cell(s), the voltage of the cell(s), and the charging current.

Once the high state of charge current limit is determined, the control circuit delivers another current limit adjustment input to the wireless power control device. This input sets the current limit of the wireless power control device to the high state of charge current limit. The high state of charge current limit will be less than the low state of charge current limit to ensure that the lower temperature threshold is maintained. The input causes the wireless power control device to reduce the voltage being applied to the cell(s) in an effort to ensure that the high state of charge temperature threshold is not breached. It serves another purpose as well, which is maintaining pass elements coupled in series with the cell to operate in a constant current mode. When those pass elements operate in a constant current mode, the power dissipation therein is reduced. Thus, embodiments of the invention not only decrease overall charge time, but reduce power dissipation in non-cell components as well. The operation described above will be more readily understood in the discussion of the figures that follow.

Figure 3:
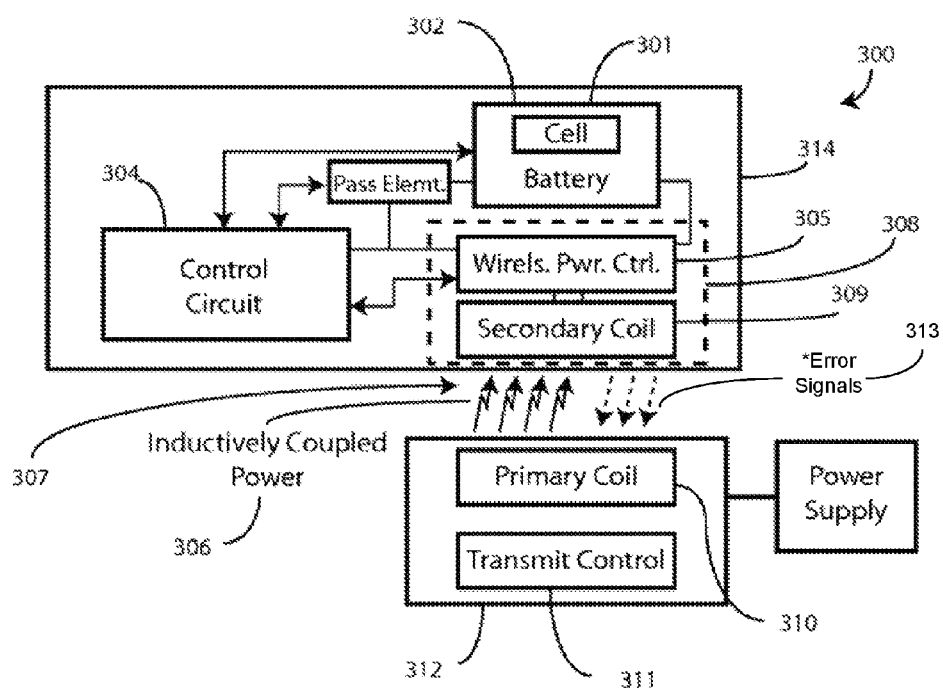
FIG. 3 illustrates one explanatory wireless charging system configured in accordance with one or more embodiments of the invention.

Turning now to FIG. 3, illustrated therein is a schematic block diagram of one embodiment of a system 300 for wireless charging configured in accordance with one or more embodiments of the invention. The system 300 includes a host device 314 that includes a battery 302 having one or more cells 301 disposed therein. Examples of host devices include portable electronic devices, such as mobile telephones, smart phones, tablet computers, laptop computers, gaming devices, multimedia devices, and so forth. Alternatively, the host device 314 can be a standalone device that is simply configured to charge the battery 302, one example of which is a wireless charging station. The cell or cells 301 can be any energy storage device. For example, the cell or cells 301 can be made from any rechargeable cell technology including, but not limited to, nickel-cadmium, nickel-metal hydride, and lithium ion technologies. In one or more embodiments the cell 301 comprises a single, lithium-based rechargeable cell, such as a lithium-ion or lithium-ion-polymer cell configured to be charged to 4.2 or 4.35 volts and discharged to 2.7 volts.

A control circuit 304 and a wireless power control device 305 provide the functional control for the host device 314. The control circuit 304 is responsible for performing the various functions of the device, while the wireless power control device 305 is tasked primarily with managing the amount of power 306 being transferred across a wireless charging interface 307. One suitable example for the wireless power control device 305 is the bq51011 integrated wireless power receiver solution manufactured by Texas Instruments.

The wireless power control device 305 is operable with a secondary coil 309 disposed in the secondary wireless charging circuit 308. The secondary coil 309 is magnetically coupled with a primary coil 310 disposed in a primary charging system 312. The primary coil 310 has its own primary power control device 311, which is operable with the primary coil 310. One example of a suitable primary power control device 311 is the bq500210 wireless power transmitter manager manufactured by Texas Instruments.

The wireless power control device 305 communicates with the primary power control device 311 to control the amount of power 306 being transferred from the primary coil 310 to the secondary coil 309. In one embodiment, the wireless power control device 305 delivers feedback in the form of an error signal 313 to the primary power control device 311. The error signal 313 provides a difference in an amount of power being received at the secondary coil 309 from a desired amount of power, thereby providing an instruction to the primary power control device 311 to increase or decrease the amount of power 306 being transferred. Other data can be included in the error signal 313, including authentication data, control data, power data, power usage data, and so forth. While error signals are one method of communicating data, it will be clear to those of ordinary skill in the art having the benefit of this disclosure that other methods can be used as well.

Power 306 received by the secondary coil 309 is then rectified and regulated by the wireless power control device 305 so that it can be used to charge the cell 301 at the direction of the control circuit 304. In one embodiment, the control circuit 304 provides feedback to adjust and control the wireless power control device 305 based upon the state of charge of the cell 301.

The control circuit 304 can be any of a number of different devices. For example, the control circuit 304 can be configured as a microprocessor, a group of processing components, one or more Application Specific Integrated Circuits (ASICs), programmable logic, or other type of processing device. The control circuit 304 can process and execute executable software code to perform the various functions of the charging the battery 302. A storage device (not shown), such as a memory module, can store the executable software code used by the control circuit 304 for operation. The storage device can be integrated into the control circuit 304 or may be a separate component.

The control circuit 304 is operable to determine one or more of the following cell parameters: the temperature of the cell 301, the voltage of the cell 301, the voltage applied to the cell 301 (and sensed by the control circuit 304) by the secondary wireless charging circuit 308, and the charging current being applied to the cell 301 by the secondary wireless charging circuit 308. The control circuit 304 is also operable to determine a state of charge of the cell 301. From the state of charge, the control circuit 304 determines in which state of charge classification the cell 301 should be. For example, in one embodiment there are two state of charge classifications: a low state of charge classification and a high state of charge classification. In another embodiment, there are three state of charge classifications: low, medium, and high. It is contemplated that any number of state of charge classifications could be employed depending upon the resolution of charge control desired.

The control circuit 304 handles charging of the cell 301 differently in the various state of charge classifications. As described above, in one embodiment different charging currents and different temperature thresholds may be used for each state of charge. Thus, when the cell 301 is in a low state of charge, for example, a higher charging current resulting in a higher cell temperature during charge may be used than when the cell 301 is in a high state of charge.

In one embodiment, once the state of charge classification is known, the control circuit 304 can determine an appropriate state of charge current limit. The state of charge current limit can be a function of the state of charge of the cell 301, the temperature of the cell 301, the voltage being applied to the cell 301, the voltage sensed by control circuit 304, the charging current, or combinations thereof. For example, if the state of charge is low, a higher current can be selected. However, the value of the current limit may be adjusted to keep the temperature of the cell 301 below the low state of charge temperature threshold. Additionally, the value of the current limit may be adjusted to keep the voltage being applied to the cell's charging circuit at a level that ensures one or more pass elements remain in a constant current mode of operation. A current limit is determined because it provides a simple way to control and/or adjust the wireless power control device 305, since many off-the shelf wireless power control devices do not have data inputs.

Once the state of charge current limit is determined, the control circuit 304 can control the wireless power control device 305 by delivering a current limit adjustment input to a current control terminal of the wireless power control device 305 to set the current limit to the state of charge current limit. The wireless power control device 305 then alters the error signals 313 delivered to the primary power control device 311 based upon the new current limit. Accordingly, by adjusting the current limit of the wireless power control device 305, the control circuit 304 is able to effectively control the amount of power 306 transferred across the wireless charging interface 307 to implement its multi-tiered charge temperature threshold method, one example of which is shown in FIG. 4.

Figure 4:
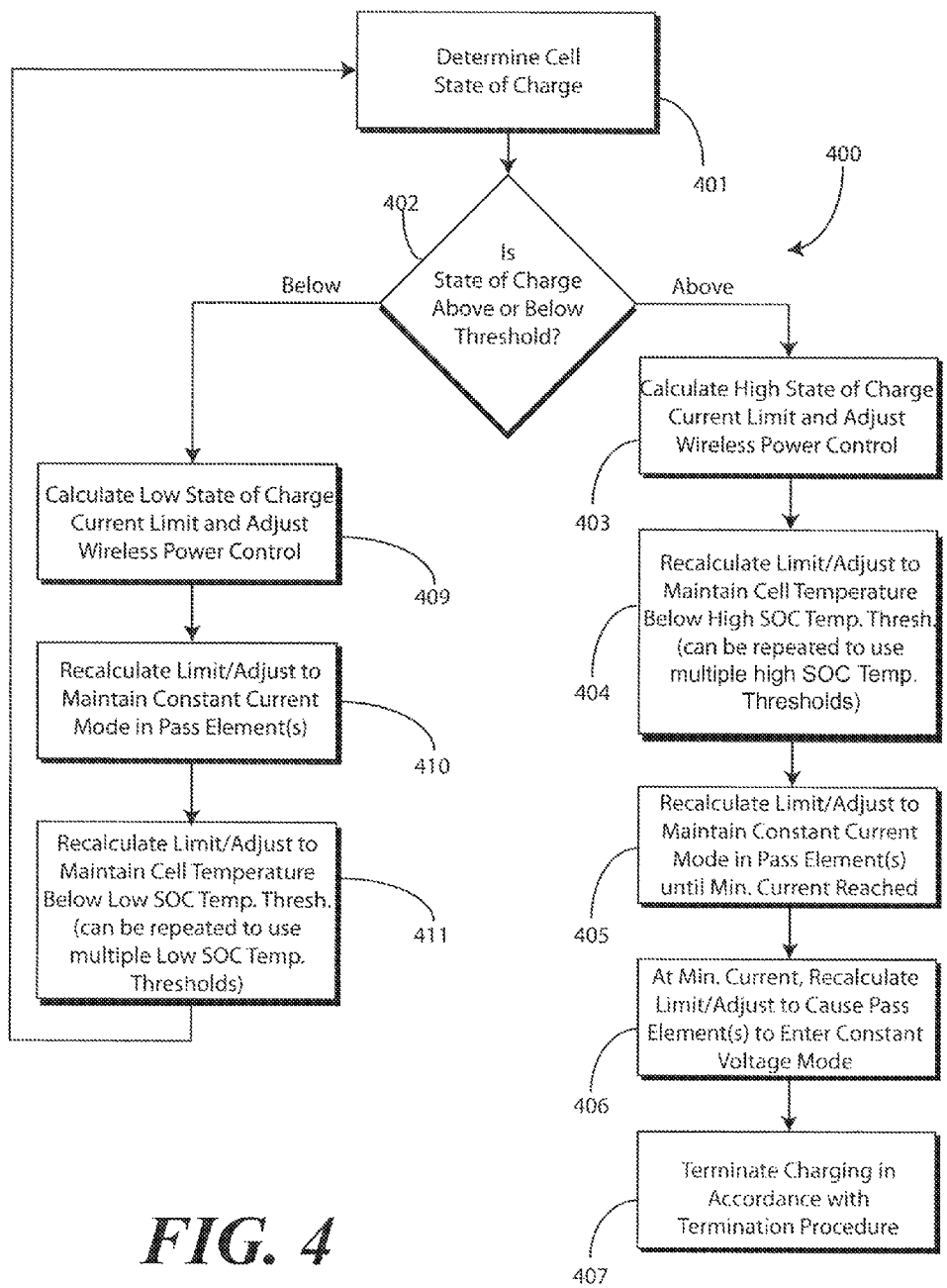
FIG. 4 illustrates one explanatory method of wirelessly charging the cells of a battery in accordance with one or more embodiments of the invention.

Turning now to FIG. 4, illustrated therein is a method 400 of adjusting a wireless power control device (305) disposed in a secondary wireless charging circuit (308) that is in communication with a primary power control device (311) of a primary charging system (312) configured in accordance with embodiments of the invention. The method 400 is suitable for being configured as executable code for execution to control the control circuit (304) of FIG. 3, for example.

At step 401, a control circuit (304) can determine the state of charge of one or more cells (301). State of charge can be determined in a variety of ways. In one simple embodiment, the state of charge of the cell (301) can be estimated by determining the voltage of the cell (301). In another embodiment, the state of charge can be determined by considering combinations of cell temperature, charge current and cell voltage. Other methods of determining state of charge will be obvious to those of ordinary skill in the art having the benefit of this disclosure. For example, state of charge can be determined by calculating the equivalent circuit parameters of a cell's resistance, inductance and capacitance by applying a pulse charge repeatedly to the cell. These equivalent circuit parameters can then be compared to those of cells previously modeled in the lab to determine an approximate state of charge. In other embodiments, the state of charge can be estimated by applying pulse currents and measuring a cell's voltage response after a delay. The voltage response can be referenced to voltage curves that correlate the response to the state of charge.

In yet other embodiments, methods of determining the state of charge of a cell involve current-based measurements using coulomb integration, voltage-based measurements based upon the resistance of the battery and a hysteresis voltage, and a combination of current-based state of charge measurements and voltage-based state of charge measurements using weighting factors. Commonly assigned U.S. Pat. No. 7,098,666 to Patino, which is incorporated herein by reference, discloses yet another method for determining a state of charge that includes measuring a cell voltage when a charging circuit is on, again measuring the cell voltage when the charging circuit is off, and calculating a difference between the measurements. Any of these (or other) methods for determining state of charge can be used at step 401. For simplicity of discussion, cell voltage will be used as an estimate of state of charge in the examples that follow.

At decision 402, the state of charge can be compared to a predetermined state of charge threshold. Using voltage as a state of charge estimator for one illustrative single cell lithium-ion cell having an operative range spanning from 2.7 to 4.2 volts, an example of a predetermined state of charge threshold may be 3.8 volts. In another illustrative cell having an operating voltage range of about 2.5 volts to about 4.35 volts, the predetermined state of charge threshold may be about 4.0 volts. As noted above, multiple thresholds can be used instead of a single threshold. In this example, when the cell voltage is 3.8 volts or lower, decision 402 indicates that the cell has a low state of charge. Where the cell voltage is above 3.8 volts, decision 402 indicates that the cell has a high state of charge.

Following the high state of charge path first, at step 403 a control circuit (304) can calculate a high state of charge current limit. In one embodiment, this limit can be a function of the state of charge only. In other embodiments, the limit can be a function of a combination of factors, including state of charge, cell temperature, cell voltage, and charging currents. For instance, in one embodiment the control circuit (304) can be configured to additionally determine a current charging the cell (301). The calculation occurring at step 403 can therefore comprise calculating the high state of charge current limit from both voltage and this determined current. Other examples of how these factors can yield the high state of charge current limit will be shown in more detail in FIGS. 7-10 below.

Figure 8:
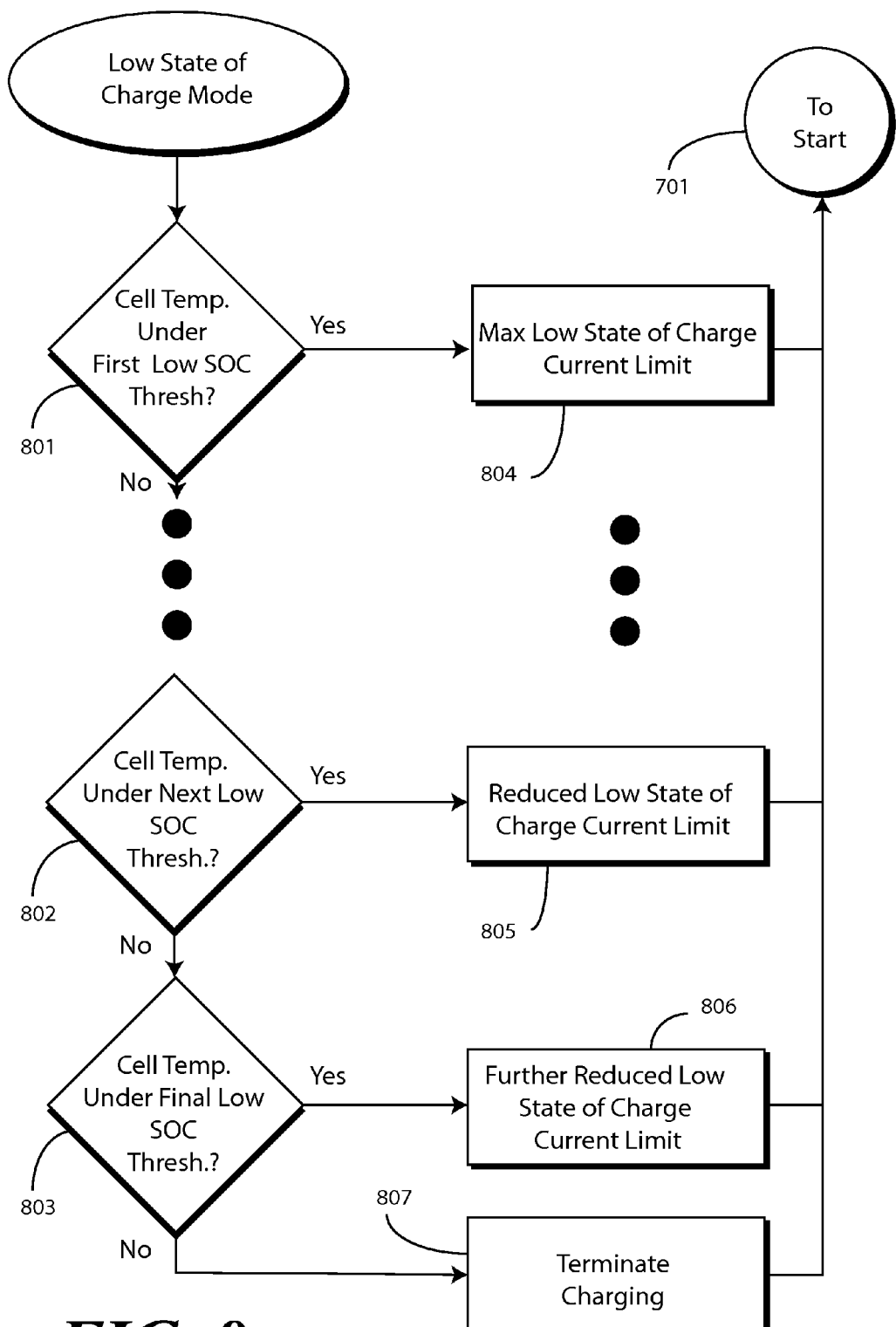

Once the high state of charge current limit is determined, step 403 can also include adjustment of a wireless power control device (305). In one embodiment, step 403 comprises delivering a current limit adjustment input that includes the high state of charge current limit to the wireless power control device (305). Where this occurs, as noted above the wireless power control device (305) adjusts its error signal (313) being transmitted to the primary power control device (311) due to the change in its perceived current limit. Accordingly, the current limit adjustment input results in a reduction of the amount of power (306) being delivered across the wireless charging interface (307). This can result in a reduction of a charging voltage received from the secondary wireless charging circuit (308) being applied to the cell (301), which can yield a variety of beneficial effects. A first beneficial effect is that the temperature of the cell (301) can be held below a high state of charge temperature threshold while charging. A second beneficial effect, which will become more apparent in the discussion of FIG. 8 is that one or more pass elements, such as switches used to permit or prohibit charging and discharging current, can be maintained in a constant current mode. Maintaining these devices in a constant current mode reduces their power dissipation, and thus allows for a higher charging current while maintaining the cell temperature below the high state of charge threshold.

In many embodiments, the high state of charge current limit will not be set only once. Instead, the control circuit (304) will continue to monitor the state of charge of the cell (301) and will continue to update the high state of charge current limit as necessary. This can be done as a function of increases in the temperature of the cell (301), increases in the state of charge of the cell (301), other factors, or combinations thereof.

For example, at step 404, where the cell temperature begins to approach the high state of charge temperature limit, the high state of charge current limit may need to be changed. Accordingly, step 404 can include recalculating the high state of charge current limit to reduce the high state of charge current limit as a function of increases in the temperature.

As noted above, it can be desirable to maintain any pass elements coupled serially with the cell in a constant current mode to reduce the amount of heat generated within the battery (302). The control circuit (304) can accomplish this in one or more embodiments, by reducing the voltage received at the charging circuit to a value slightly above that of the cell (301) so that little or no power dissipation is required in any serial elements. Accordingly, step 405 can comprise recalculating the high state of charge current limit to maintain the serial pass elements in a constant current mode. In another embodiment, step 405 can also include determining an amount of power dissipation occurring in the pass elements. Where the amount of power dissipation exceeds a predetermined power dissipation threshold, step 405 can include decrementing the high state of charge current limit and delivering another current limit adjustment input comprising the high state of charge current limit after the decrementing to the wireless power control device.

Once the state of charge approaches the termination point where the cell (301) is fully charged, the current may be reduced to a level that is too low for constant current operation of the serial elements to continue. Accordingly, step 406 can comprise recalculating the high state of charge current limit to reduce the high state of charge current limit to a level that permits or causes the serial elements to enter a constant voltage mode. Charging then terminates at step 407. In one embodiment, this termination of charging includes the cell (301) first reaching a termination voltage, with a charge current tapering slowly to lower values, e.g., the charge capacity divided by a predetermined factor, one example of which is 20.

Turning now to the low state of charge path, when the state of charge is below the predetermined threshold as determined at decision 402, the control circuit (304) can calculate a low state of charge current limit at step 409. As noted above, and as will be shown graphically in FIG. 5 below, in one or more embodiments a tiered current and/or temperature threshold will be used where the low state of charge temperature threshold, the low state of charge current limit, or both, will be higher than their counterparts occurring when the cell (301) is in the high state of charge. Thus, step 409 can result in a low state of charge current limit that is higher than the high state of charge current limit calculated at step 403. Step 409 can also include delivering another current limit adjustment input to the wireless power control device (305) to set the current limit of the wireless power control device (305) to the low state of charge current limit. Where the low state of charge current limit is higher than the high state of charge current limit, step 409 can cause the temperature of the cell (301) to rise above the predetermined high state of charge cell temperature threshold. However, when using the tiered approach, the low state of charge current limit will maintain the cell temperature below a predetermined low state of charge cell temperature threshold being used.

As with the high state of charge path, in the low state of charge path it can be desirable to maintain any pass elements coupled serially with the cell in a constant current mode to reduce the amount of heat generated within the battery (302). The control circuit (304) can accomplish this in one or more embodiments, by reducing the voltage received at the charging circuit to a value slightly above that of the cell (301) so that little or no power dissipation is required in any serial elements. Accordingly, step 410 can comprise recalculating the low state of charge current limit to maintain the serial pass elements in a constant current mode.

Similarly, and perhaps more importantly, at step 411, where the cell temperature begins to approach the low state of charge temperature limit, the low state of charge current limit may need to be changed. Accordingly, step 411 can include recalculating the low state of charge current limit to reduce the low state of charge current limit as a function of increases in the temperature. The result of this recalculation is that multiple low state of charge current limits will be employed.

Figure 5:
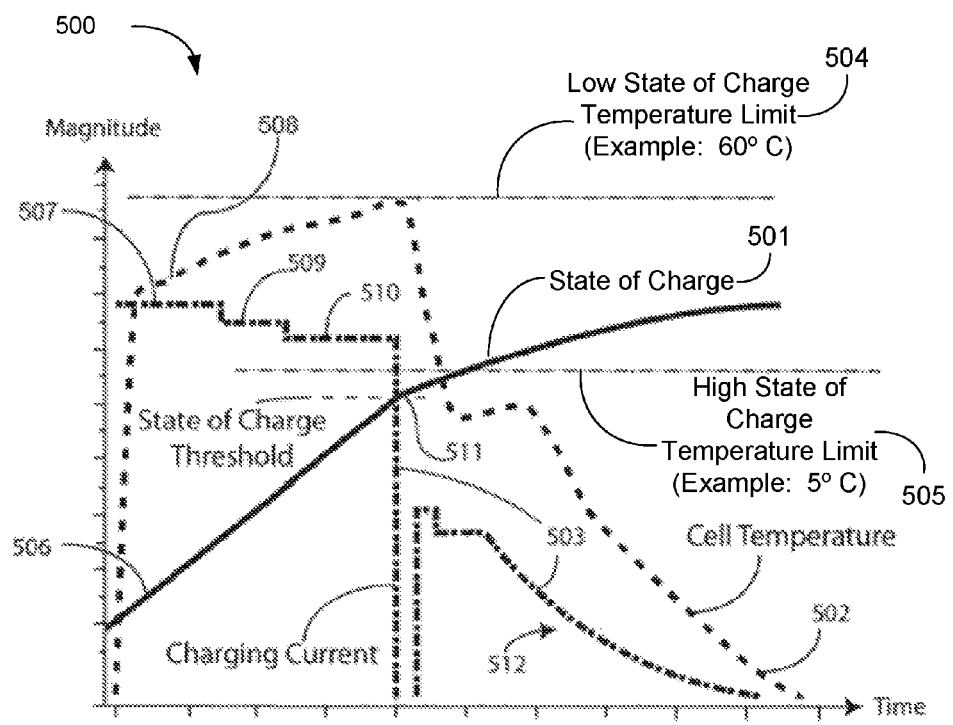
FIG. 5 illustrates an explanatory dual temperature threshold charging termination configured in accordance with one or more embodiments of the invention.

Results of embodiments of the method described in FIG. 4 are shown graphically in FIG. 5. Turning now to FIG. 5, illustrated therein is a graph 500 showing state of charge 501, cell temperature 502, and charging current 503 being managed in accordance with the method of FIG. 4.

As shown in the graph 500, different temperature thresholds are being employed for different states of charge. A low temperature state of charge temperature threshold 504 is used as an upper temperature limit when the cell (301) is in the low state of charge, and a high temperature state of charge temperature threshold 505 is used when the cell (301) is in the high state of charge. As shown, the low temperature state of charge temperature threshold 504 is higher than the high state of charge temperature threshold 505. Accordingly, the temperature of the cell (301) is permitted to be higher during charging while the cell (301) is in the low state of charge than when in the high state of charge.

Presuming that the cell (301) was initially in the low state of charge initially at point 506, the method (400) of FIG. 4 would determine this state of charge at step (401), and determine that the state of charge was lower than the predetermined state of charge threshold at decision (402). Accordingly, at step (403) the low state of charge current limit would be calculated. Further, the wireless power control device (305) would be adjusted to the low state of charge current limit, which results in the cell (301) being charged at an initial current level shown at point 507.

As shown in the graph 500, this causes the cell temperature 502 to start rising as shown at point 508. The method (400) could then perform the recalculations described at steps (410, 411) to continually adjust the low state of charge current limit as shown at points 509, 510. When the cell temperature 502 approaches the low state of charge temperature threshold 504, the low state of charge current limit may be reduced significantly as shown in the graph 500.

Once the state of charge 501 transitions from the low state of charge to the high state of charge at point 511, the maximum temperature at which the cell (301) is allowed to charge changes to a lower value in this illustrative embodiment. Accordingly, the high state of charge current limit will be calculated at step (403) and, as shown in the graph 500, will be lower than the low state of charge current limit to maintain the cell temperature 502 below the high state of charge temperature threshold 505. Steps (403,404,405,406,407) can then be executed as described above to terminate charging as shown at portion 512 of the charging current 503.

Figure 6:
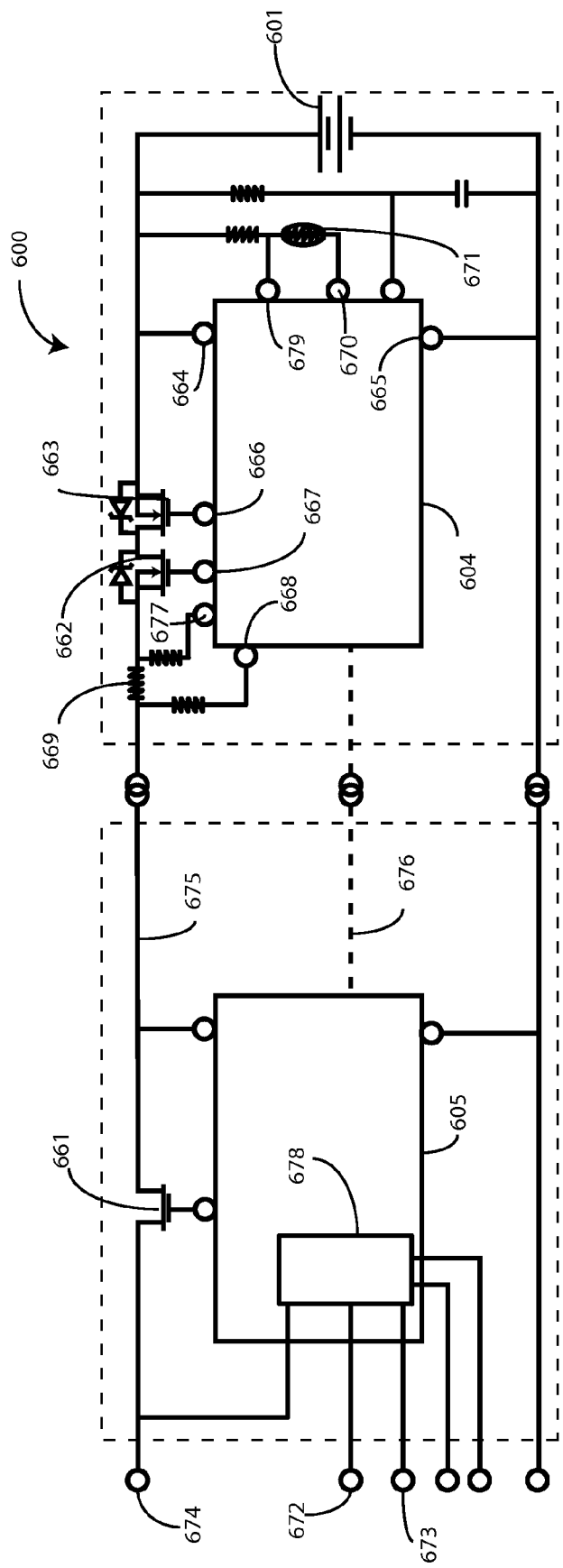
FIG. 6 illustrates one explanatory system for wirelessly charging the cells of a battery in accordance with one or more embodiments of the invention.

Turning now to FIG. 6, illustrated therein is a more detailed schematic diagram of a system 600 for wireless charging configured in accordance with one or more embodiments of the invention. While FIG. 3 above illustrated general block components, FIG. 6 provides a more detailed view of one explanatory wireless charging circuit. For example, FIG. 6 includes not only the cell 601, the control circuit 604, and the wireless power control device 605, but also multiple pass elements 661,662,663 coupled serially with the cell 601 as well.

In addition to determining state of charge, state of charge current limits, and making adjustments to the wireless power control device 605, the control circuit 604 can be equipped with other features as well. Some of those features will be described now.

In the illustrative embodiment of FIG. 6, current flowing through the cell 601 is monitored with sense nodes 668,677. Sense node 668 also serves as a voltage-sensing node for determining the voltage at node 675. Sense nodes 668,677 are coupled to a current sense resistor 669. By determining a voltage across the current sense resistor 669, the control circuit 604 can determine the charging current. While the use of a current sense resistor 669 is one device suitable for determining the charging current, numerous other methods and circuits for determining the charging current will be obvious to those of ordinary skill in the art having the benefit of this disclosure.

Other components of the control circuit 604 include a temperature-sensing node 670. The temperature-sensing node 670 may be coupled to a thermistor 671 or other temperature-sensing device to monitor the temperature of the cell 601. In so doing, the control circuit 604 can determine whether the cell temperature (502) is being maintained beneath one of the predetermined state of charge temperature thresholds.

The wireless power control device 605 has two AC input terminals 672,673 that are coupled to the secondary coil (309) and that receive AC power from the primary of the wireless charging system. A rectifier 678 then converts the AC power to DC power and provides a rectified voltage to a rectified voltage node 674. After identifying itself to the primary power control device (311), the wireless power control device 605 begins sensing the power received from the primary power control device (311) by monitoring the voltage at the rectified voltage node 674. The wireless power control device 605 has an internally programmed desired voltage, and determines the difference between the measured voltage at the rectified voltage node 674 and the desired voltage and begins transmitting the error signals (313) to the primary power control device (311) until the measured voltage at the rectified voltage node 674 reaches the desired target.

The wireless power control device 605 controls a pass element 661, configured here as a MOSFET that functions as a voltage regulator when the current being delivered to the cell 601 is below the programmed current limit of the wireless power control device 605. The current limit of many prior art wireless power control device is set by a resistor divider and remains fixed. Accordingly, the pass element 661 either operates in a constant current mode by remaining saturated or in a constant voltage mode by functioning as a voltage regulator. During the constant current mode, the voltage at the rectified voltage node 674 will be above the voltage at output voltage node 675 by only the current limit multiplied by the ON-resistance of the pass element 661. However, in the constant voltage mode, the difference between the voltages at rectified voltage node 674 and node 675 can be quite higher.

Embodiments of the present invention contemplate that there are multiple sources of heat generation in the system 600 of FIG. 6. To begin, when the cell 601 is being charged, it heats due to its internal series resistance. Each of the pass elements 661,662,663 can generate heat as well. This is especially true when operating in a mode other than a constant current mode where the pass elements 661,662,663 are fully saturated. Embodiments of the invention provide a mechanism for the control circuit 604 can alter the current limit of the wireless power control device 605 to not only allow the temperature of the cell 601 to rise higher at low states of charge than at high states of charge, but also to maintain the pass elements 661,662,663 in their constant current modes as long as possible to mitigate heat generation within the system 600. As shown in this embodiment the current limit used when the system is in the constant current mode is a function of the voltage at node 675. This current limit causes the pass elements 661, 662, 663 to remain in a collapsed state.

Adjustment of the wireless power control device can be accomplished in a variety of ways. In the explanatory embodiment of FIG. 6, a data connection 676 is provided between the control circuit 604 and the wireless power control device 605 that allows the control circuit 604 to adjust the wireless power control device 605 by simply writing data comprising the adjusted current limit to a memory of the wireless power control device 605. However, in other embodiments, other adjustment controls can be used. These other adjustment controls can make it simpler to implement embodiments of the invention with off-the-shelf components.

For example, in one embodiment where the current limit of the wireless power control device 605 is established by a resistor divider, data connection 676 could be replaced by an output of an amplifier configured to adjust the voltage of the resistor divider central node. Similarly, one side of the resistor divider could be replaced with a plurality of resistors each coupled to the resistor divider central node via a switch. Thus, data connection 676 could be replaced by a multiplexed control to actuate one or more of the switches to change the equivalent impedance of that one side of the resistor divider. Other communication and adjustment circuits will be obvious to those of ordinary skill in the art having the benefit of this disclosure.

As described above, the control circuit 604 can determine the current limit to which the wireless power control device should be adjusted in a variety of ways. In one embodiment, the current limit can be determined only from the state of charge of the cell 601. In another embodiment, the current limit can be based upon the state of charge of the cell 601 and the power dissipation of the pass elements 661,662,663 in an effort to keep the heat generation of the pass elements 661, 662,663 low. In another embodiment, the current limit can be based upon the state of charge of the cell 601 and the temperature of the cell 601, as temperature is an approximation of the heat generation of all components of the system. In another embodiment, the current limit can be based upon the voltage at node 675. The control circuit 604 can compare temperature and state of charge status to predefined tables in its memory to conclude whether the cell 601 is likely generating more of the heat or whether the pass elements 661,662, 663 are likely causing the increase in temperature.

In one embodiment, the control circuit 604 is configured to determine a state of charge of the cell 601, the temperature of the cell 601, and to calculate a state of charge current limit as a function of a combination of the state of charge and the temperature. Once this limit is calculated, the control circuit 604 is configured to adjust the wireless power control device 605 such that its current limit is set to the state of charge current limit. As noted above, in one or more embodiments, the state of charge current limit will be higher when the state of charge of the cell 601 is equal to or below a predetermined state of charge threshold, e.g., 3.8 volts, than when the state of charge of the cell 601 is above the predetermined state of charge threshold. In one or more embodiments, to accommodate the multi-tiered thermal control described above with reference to FIG. 5, the state of charge current limit is configured to make the temperature of the cell 601 higher when the state of charge is below a predetermined state of charge threshold than when the state of charge is above the predetermined state of charge threshold.

To mitigate heat generation from components other than the cell 601, the control circuit 604 can be configured to determine an amount of power dissipation in at least one of the pass elements 661,662,663 coupled serially with the cell 601. When the state of charge is above a predetermined state of charge threshold and when the amount of power dissipation is above a predetermined power dissipation threshold, the control circuit 604 can be configured to reduce the state of charge current limit. In another embodiment, the control circuit 604 can be configured to reduce the state of charge current limit as a function of increases in the temperature of the cell 601, the pass elements 661,662,663, or combinations of these. As noted above, the control circuit 604 can use the data connection 676 to adjust the wireless power control device 605 by delivering data comprising the state of charge current limit to an input of the wireless power control device 605.

Turning now to FIGS. 7-10, illustrated therein is one explanatory method that can be configured as executable code for the control circuit (604) of FIG. 6 to effect efficient wireless charging in accordance with one or more inventions. For illustration, the values given will be for a single lithium-ion cell. Further, it should be understood that the values are explanatory only, and will change for different cell technologies. Thus, they do not limit the claims set forth below.

Generally speaking, the method includes, at a secondary side of a wireless charging system, and in a control circuit operable with one or more cells, determining a state of charge of the one or more cells and a temperature of the one or more cells. When the state of charge is greater than a state of charge threshold, the method includes calculating a high state of charge current limit as a function of the state of charge and the temperature. Once this current limit has been calculated, the method includes adjusting a current limit of a wireless power control device to the high state of charge current limit. When the determined temperature rises, the method can include reducing the high state of charge current limit.

The method can optionally include determining an amount of power dissipation in at least one pass element coupled serially with the one or more cells. Where the amount of power dissipation exceeds a predetermined power dissipation threshold, the method can include reducing the high state of charge current limit sufficiently to permit the at least one pass element to operate in a constant current mode while maintaining the temperature below a predetermined high state of charge temperature threshold.

The method can optionally include measuring, with a current sensor operable with a control circuit, a current charging the one or more cells and comparing the current to a minimum constant current threshold. Where the current at charging the one or more cells is less than the minimum constant current threshold, the method can include adjusting the high state of charge current limit, thereby causing the at least one pass element to operate in a constant voltage mode. In one or more embodiments, the high state of charge current limit is configured to limit a current charging the one or more cells such that the temperature does not exceed a predetermined high state of charge cell temperature threshold.

When the state of charge is less than the state of charge threshold, the method can include calculating a low state of charge current limit as a function of the state of charge and the temperature and adjusting the current limit of the wireless power control device to the low state of charge current limit, thereby causing the temperature to exceed the predetermined high state of charge cell temperature threshold. The low state of charge current limit can configured to regulate the current charging the one or more cells such that the temperature remains below a predetermined low state of charge cell temperature threshold. In one illustrative embodiment, the predetermined low state of charge cell temperature threshold is about 45 degrees centigrade and the predetermined high state of charge cell temperature threshold is about 60 degrees centigrade.

Figure 7:
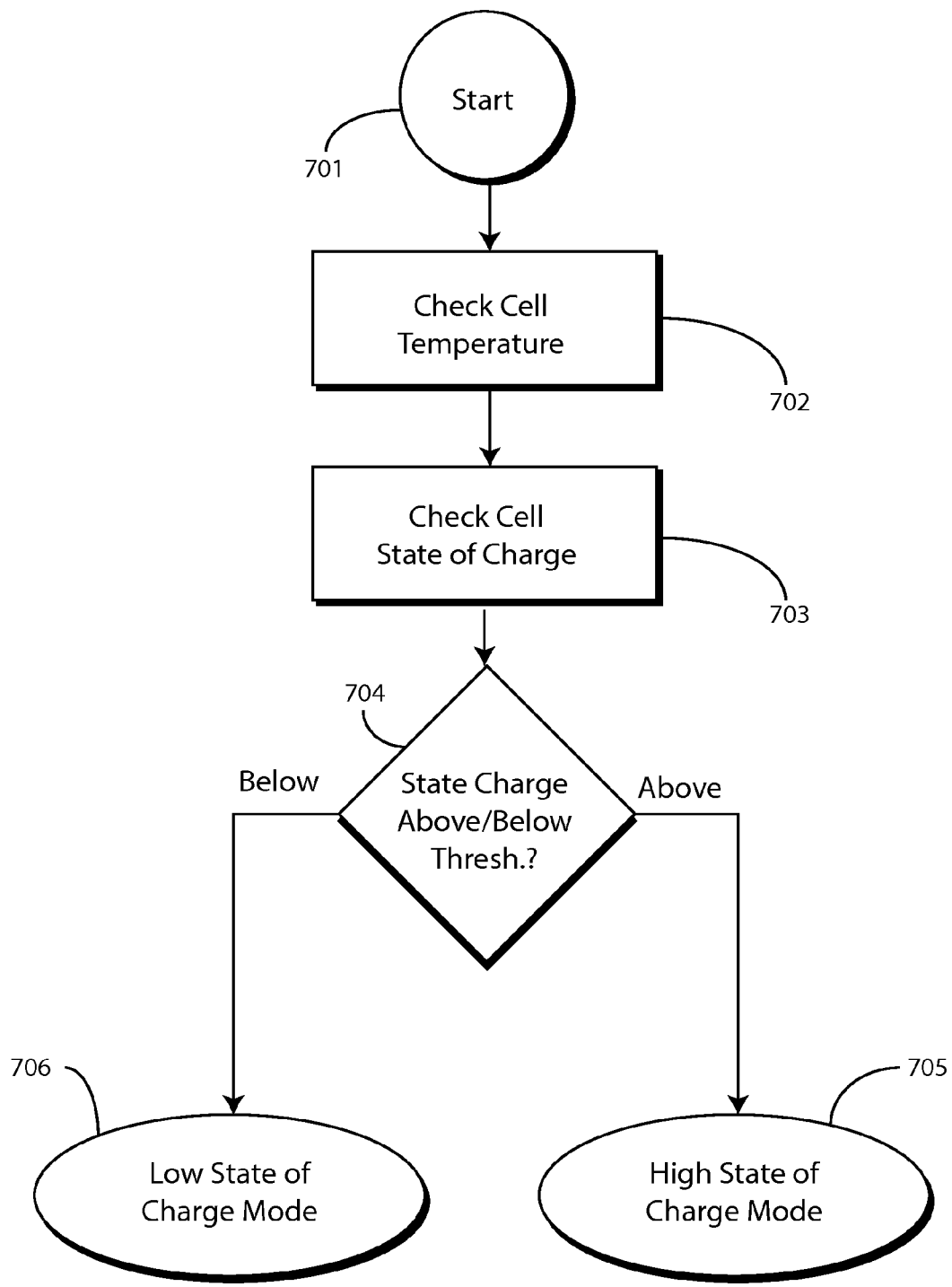
FIGS. 7-10 illustrate another explanatory method of wirelessly charging the cells of a battery configured in accordance with one or more embodiments of the invention.

Turning now to FIG. 7, the method starts at step 701. At step 702 the temperature is measured. In one embodiment, this is the temperature of the cell. In another embodiment, this is the temperature of the overall system. In yet another embodiment, this is the temperature of the cell and at least one pass element.

At step 703, the state of charge of the cell is determined in one of the methods described above. At decision 704, it is determined whether the state of charge is above a predetermined threshold or below. Where above, the method transitions to the high state of charge path at step 705. Alternatively, the method transitions to the low state of charge path at step 706. FIG. 8 illustrates the latter, while FIGS. 9-10 illustrate the former.

Turning to FIG. 8, in this method, the temperature of the cell is continually monitored. Decisions 801,802,803 compare the temperature to various thresholds. Decision 801 compares the temperature to a first low state of charge temperature threshold, which may be about 53 degrees centigrade. The number of decisions can be as desired by the designer depending upon granularity of current limit setting. Decision 802 can compare the temperature to another low state of charge temperature threshold, which may be 57 degrees centigrade. The final decision 803 can compare the temperature to a maximum low state of charge temperature threshold, which in one embodiment for a single lithium-ion cell may be 60 degrees centigrade.

Where the temperature is less than or equal to the first threshold as determined at decision 801, the current limit can be set to a maximum low state of charge current limit at step 804. Where the temperature increases, such as determined at decision 802, the current limit can be reduced at step 805. The same can be done at step 806. If the cell temperature exceeds the maximum low state of charge temperature threshold, charging can be terminated step 807 and at the same time, a charge complete message can be sent to the primary to disable power transfer, thereby further reducing heating of the system. The process can repeat, returning to the decision steps of FIG. 7 via step 701 until the cell reaches the high state of charge.

Figure 9:
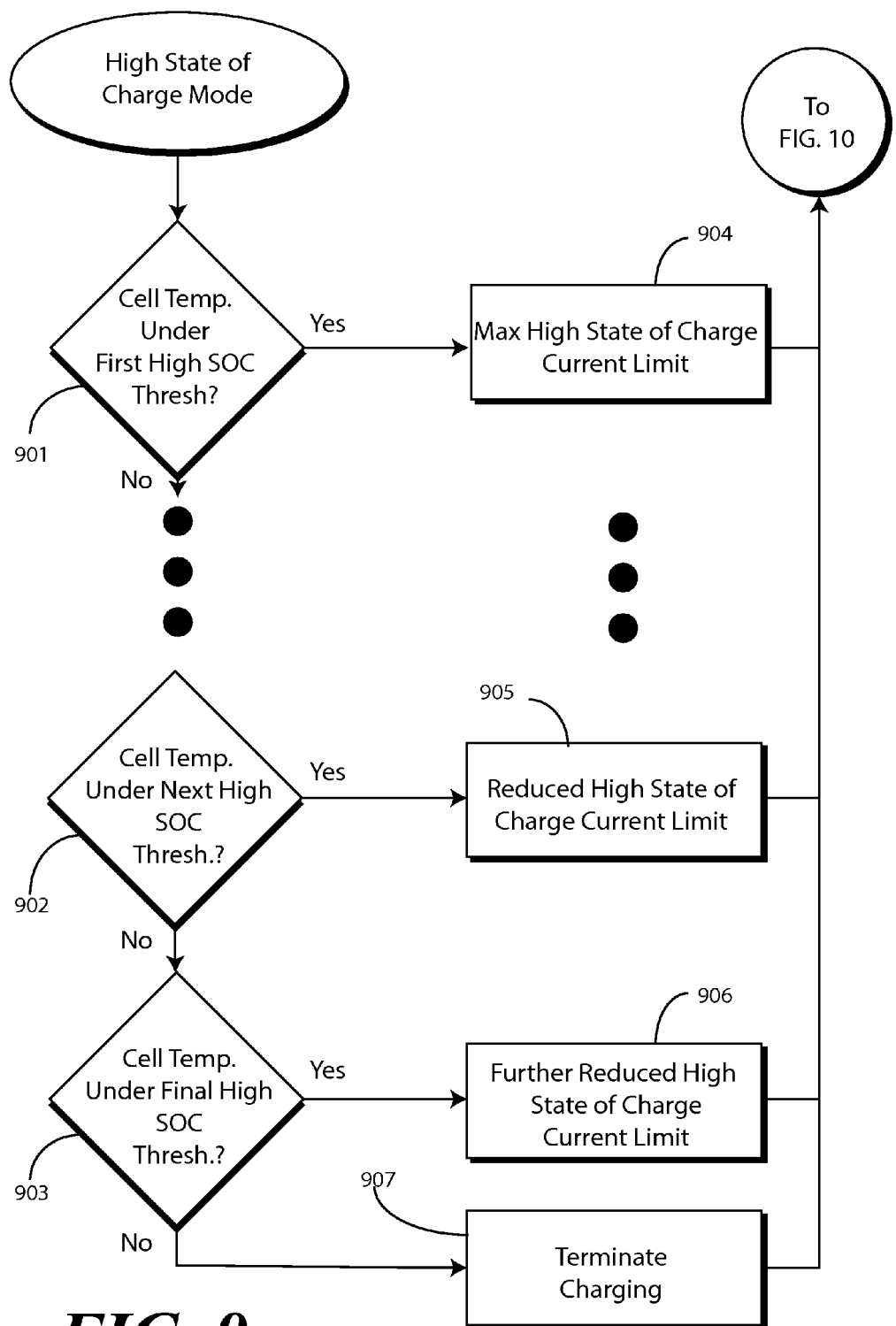
Figure 10:
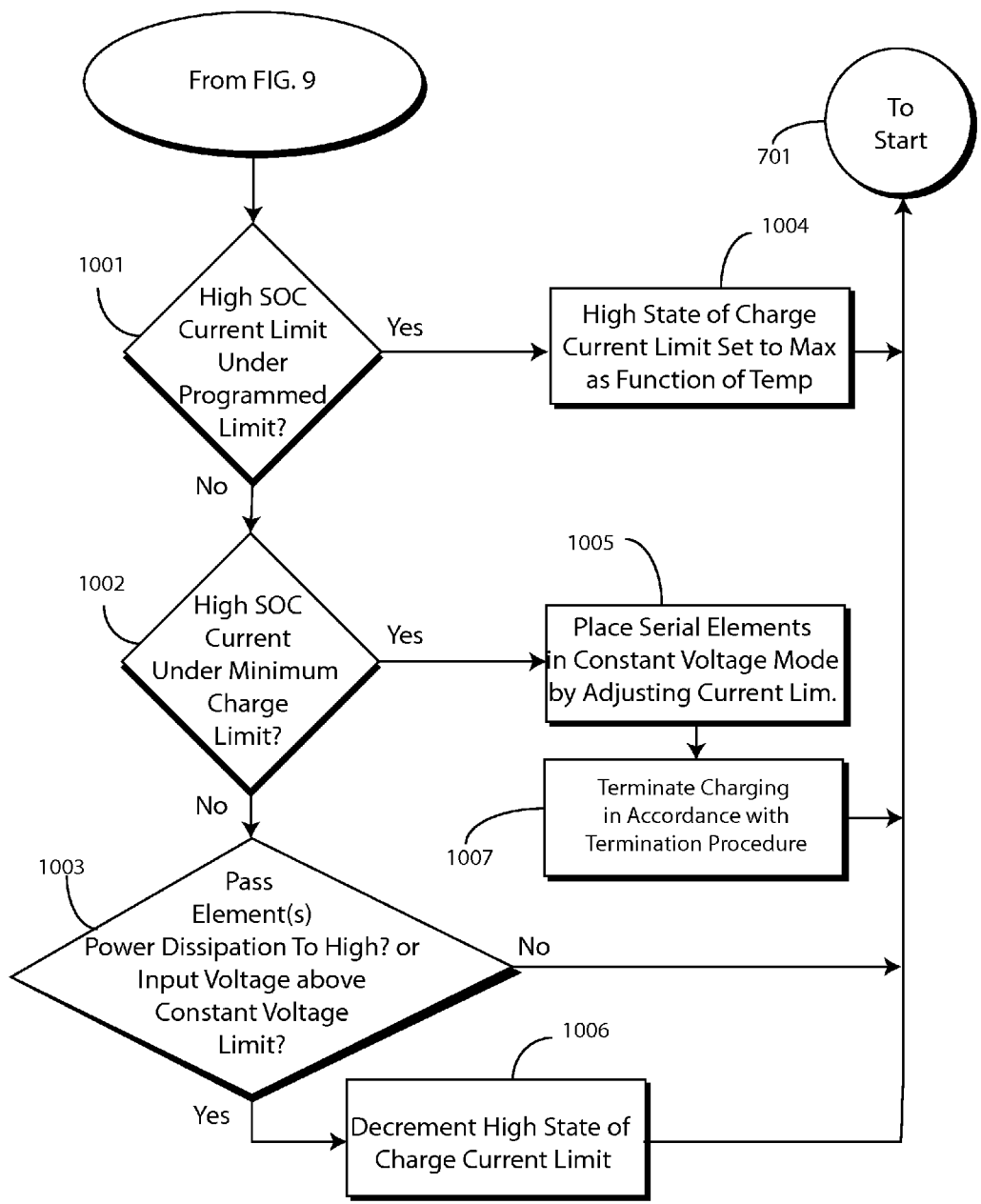

Turning now to FIGS. 9 and 10, once the cell transitions from low state of charge to high state of charge, two things happen: first, cell temperature is monitored in FIG. 9 very much like it was in FIG. 8 (albeit with different temperature thresholds as described above) for the low state of charge. At the same time, charging current is monitored in FIG. 10. These figures will be described separately, but can occur simultaneously as shown in the "To FIG. 10" step shown in FIG. 9.

Beginning with FIG. 9, decisions 901,902,903 compare the temperature to various thresholds. Decision 901 compares the temperature to a first high state of charge temperature threshold, which will be lower than the low state of charge temperature threshold. One example of such a threshold is about 41 degrees centigrade. As with FIG. 8, the number of decisions employed can be selected by the designer as desired for a particular application. For example, decision 902 can compare the temperature to another high state of charge temperature threshold, which may be 43 degrees centigrade. The final decision 903 can compare the temperature to a maximum high state of charge temperature threshold, which in one embodiment for a single lithium-ion cell may be 45 degrees centigrade.

Where the temperature is less than or equal to the first threshold as determined at decision 901, the current limit can be set to a maximum high state of charge current limit at step 904. Where the temperature increases, such as determined at decision 902, the current limit can be reduced at step 905. The same can be done at step 906. If the cell temperature exceeds the maximum high state of charge temperature threshold, the current limit can be set to zero at step 907 and the transmitter may be disabled. The process can repeat.

The current monitoring is shown in FIG. 10. FIG. 10 also provides insight into the control of a wireless power control device occurring in accordance with one or more embodiments of the invention. At decision 1001, the current limit determined by the methods shown in FIG. 9 is compared to a programmed current limit set in a wireless power control device. Where the calculated current limit is less than the programmed current limit, the current limit of the wireless power control device is adjusted to the calculated current limit at step 1004.

Where the calculated current limit is above the programmed current limit, the method compares a minimum constant current permitted to maintain the pass elements in a constant current mode and compares it to the calculated current limit of the wireless power control device. Where the calculated current limit is below the minimum constant current limit, an adjustment is made to set the current limit of the wireless power control device to place the system in constant voltage mode.

Where the calculated current limit is above the minimum constant current limit as determined at decision 1002, the method considers both power dissipation in the pass elements and the voltage delivered from the secondary of the wireless charging system at decision 1003. If either the power dissipation of the pass elements is above a predetermined threshold or the voltage delivered from the secondary is above a constant voltage threshold, the current limit of the wireless power control device is adjusted lower at step 1006. Otherwise, the method repeats by starting again at step 701.

Where the calculated current limit is below the minimum constant current limit as determined at decision 1002, the current limit of the wireless power control device is left at the calculated current limit at step 1005 and continues through the constant voltage portion of the charging cycle. The charge process is terminated when the appropriate charge completion conditions have been achieved at step 1007. Executing the method shown in FIGS. 7-10 results in a charging curve similar to that shown in FIG. 5. Said differently, the method described in FIGS. 7-10 yields results similar to that shown in FIG. 5.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method of adjusting a wireless power control device of a secondary of a wireless charging circuit for one or more cells configured to be charged via a primary side of the wireless charging circuit, the method comprising:
   in a control circuit operable with the one or more cells,
      determining a state of charge of the one or more cells, a temperature of the one or more cells, and a voltage received from the secondary of the wireless charging circuit;

in response to the state of charge being below a predetermined state of charge threshold:
calculating, in the control circuit, a low state of charge current limit that is determined based upon the state of charge, the temperature of the one or more cells, and the voltage received from the secondary side of the wireless charging circuit;
delivering, to the wireless power control device, a current adjustment input comprising the low state of charge current limit;
monitoring the temperature of the one or more cells to identify if the temperature of the one or more cells is remaining below a predetermined low state of charge cell temperature threshold;
recalculating the low state of charge current limit to reduce the low state of charge current limit as a function of one or more increases in the temperature of the one or more cells;
prior to the temperature of the one or more cells breaching the predetermined low state of charge cell temperature threshold, reducing the low state of charge current limit using the recalculated low state of charge current limit effective to prevent the temperature of the one or more cells from breaching the predetermined low state of charge cell temperature threshold;
transitioning to an operating state associated with a high state of charge; and
responsive to transitioning to the operating state associated with the high state of charge, comparing the temperature of the one or more cells to a predetermined high state of charge cell temperature threshold instead of the predetermined low state of charge cell temperature threshold effective to prevent the temperature of the one or more cells from exceeding the predetermined high state of charge cell temperature threshold; and in response to the state of charge being above the predetermined state of charge threshold:
calculating, in the control circuit, a high state of charge current limit that is less than the low state of charge current limit, the high state of charge current limit based upon the state of charge, the temperature of the one or more cells, and the voltage received from the secondary side of the wireless charging circuit; and
delivering a current adjustment input comprising the high state of charge current limit to the wireless power control device of the wireless charging circuit effective to:
reduce the voltage received from the secondary side of the wireless charging circuit; maintain the temperature of the one or more cells below the predetermined high state of charge cell temperature threshold; and
maintain a constant current operating mode in one or more pass elements coupled serially with the one or more cells.

2. The method of claim 1, further comprising wirelessly communicating power information, from the secondary side to the primary side, using one or more error signals.

3. The method of claim 1, further comprising:
in response to the state of charge being above the predetermined state of charge threshold:
determining an amount of power dissipation in one or more serial pass elements; and
responsive to the amount of power dissipation exceeding a predetermined power dissipation threshold:
decrementing the high state of charge current limit effective to generate a new high state of charge current limit; and
delivering, to the wireless power control unit, a current limit adjustment input based on the new high state of charge current limit.

4. The method of claim 1, wherein calculating the high state of charge current limit further comprises:
responsive to one or more increases in the temperature of the one or more cells, recalculating the high state of charge current limit based on the one or more increases in the temperature of the one or more cells effective to reduce the high state of charge current limit.

5. The method of claim 4, wherein, responsive to the recalculating resulting in a reduced high state of charge current limit, delivering, to the wireless power control device, a current limit adjustment input based on the reduced high state of charge current limit.

6. A system for wireless charging, comprising:
one or more cells;
one or more pass elements coupled serially with the one or more cells;
a control circuit operable with the one or more pass elements;
a temperature sensor, operable with the control circuit, and configured to sense a temperature of the one or more cells; and
a secondary side of a wireless power transfer system configured to deliver power to the one or more cells, the secondary side comprising a wireless power control device,
the control circuit further configured to:
determine a state of charge of the one or more cells;
determine, with the temperature sensor, the temperature of the one or more cells;
responsive to determining the state of charge being below a predetermined state of charge threshold:
calculate a low state of charge current limit based, at least in part, on a combination of the state of charge and the temperature of the one or more cells;
monitor a charging current associated with charging the one or more cells to identify if the charging current is remaining below the low state of charge current limit;
monitor the temperature of the one or more cells to identify if the temperature of the one or more cells is remaining below a predetermined low state of charge cell temperature threshold;
recalculate the low state of charge current limit to reduce the low state of charge current limit based upon one or more increases in the temperature of the one or more cells;
prior to the temperature of the one or more cells breaching the predetermined low state of charge cell temperature threshold, reduce the low state of charge current limit effective to prevent the temperature of the one or more cells from breaching the predetermined low state of charge cell temperature threshold; and
transition to an operating state associated with a high state of charge at least by comparing the temperature of the one or more cells to a predetermined high state of charge cell temperature threshold instead of the predetermined low state of charge cell temperature threshold effective to prevent the temperature of the one or more cells from exceeding the predetermined high state of charge cell temperature threshold; and responsive to the state of charge being above the predetermined state of charge threshold:
calculate a high state of charge current limit as a function of a combination of the state of charge and the temperature of the one or more cells;
monitor the temperature of the one or more cells to identify if the temperature of the one or more cells is remaining below a predetermined high state of charge temperature threshold; and
adjust the high state of charge current limit based upon one or more increases in the temperature of the one or more cells.

7. The system of claim 6, wherein the low state of charge current limit is higher than the high state of charge current limit.

8. The system of claim 6, wherein the predetermined low state of charge temperature threshold is higher than the predetermined high state of charge temperature threshold.

9. The system of claim 6, wherein the control circuit is further configured to:
determine an amount of power dissipation in at least one pass element of the one or more pass elements; and
responsive to the state of charge being above the predetermined state of charge threshold and the amount of power dissipation being above a predetermined power dissipation threshold, reduce the high state of charge current limit.

10. The system of claim 6, wherein the control circuit is configured to wirelessly communicate information to a primary side of the wireless power transfer system, the information comprising at least one of:
power adjustment data;
authentication data;
control data; or
power usage data.

11. The system of claim 6, wherein the control circuit is configured to adjust the wireless power control device by delivering data comprising the high state of charge current limit or the low state of charge current limit to an input of the wireless power control device.

12. A method of wirelessly charging one or more cells of a battery, the method comprising:
at a secondary side of a wireless charging system, in a control circuit operable with the one or more cells, determining a state of charge of the one or more cells and a temperature of the one or more cells;
in response to the state of charge being greater than a state of charge threshold, at the control circuit:
calculating a high state of charge current limit as a function of the state of charge and the temperature of the one or more cells; and
adjusting a current limit of a wireless power control device to the high state of charge current limit; and
in response to the state of charge being less than the state of charge threshold:
calculating, as a function of the state of charge and the temperature of the one or more cells, a low state of charge current limit that is higher than the high state of charge current limit;
adjusting the current limit of the wireless power control device to the low state of charge current limit;

monitoring the temperature of the one or more cells to identify if the temperature of the one or more cells is remaining below a predetermined low state of charge cell temperature threshold;
recalculating the low state of charge current limit to reduce the low state of charge current limit as a function of one or more increases in the temperature of the one or more cells;
prior to the temperature of the one or more cells breaching the predetermined low state of charge cell temperature threshold, reducing the low state of charge current limit effective to prevent the temperature of the one or more cells from breaching the predetermined low state of charge cell temperature threshold;
transitioning to an operating state associated with a high state of charge; and
responsive to transitioning to the operating state associated with the high state of charge, comparing the temperature of the one or more cells to a predetermined high state of charge cell temperature threshold instead of the predetermined low state of charge cell temperature threshold effective to prevent the temperature of the one or more cells from exceeding the predetermined high state of charge cell temperature threshold.

13. The method of claim 12, wherein the predetermined high state of charge cell temperature threshold is 5 degrees centigrade and the predetermined low state of charge cell temperature threshold is 60 degrees centigrade.

14. The method of claim 12, wherein the high state of charge current limit is configured to prevent the temperature of the one or more cells from exceeding the predetermined high state of charge cell temperature threshold by limiting a current charging the one or more cells.

15. The method of claim 14 further comprising:
wirelessly communicating power information, from the secondary side to a primary side of the wireless charging system, using one or more error signals.

16. The method of claim 12, further comprising reducing the high state of charge current limit when the temperature of the one or more cells rises.

17. The method of claim 16, further comprising:
determining an amount of power dissipation in at least one pass element coupled serially with the one or more cells; and
responsive to the amount of power dissipation exceeding a predetermined power dissipation threshold, reducing the high state of charge current limit to permit the at least one pass element to operate in a constant current mode while maintaining the temperature of the one or more cells below the predetermined high state of charge temperature threshold.

18. The method of claim 17, further comprising:
measuring, with a current sensor operable with the control circuit, a current charging the one or more cells;
comparing the current to a minimum current threshold; and
responsive to the current charging the one or more cells dropping below the minimum current threshold, adjusting the high state of charge current limit effective to operate the at least one pass element in a constant voltage mode.

* * * * *